April 22, 1941.  M. EPSTEIN  2,239,266

SPECTACLE MOUNTING

Filed Aug. 28, 1939

INVENTOR
Morris Epstein
BY
ATTORNEY

Patented Apr. 22, 1941

2,239,266

UNITED STATES PATENT OFFICE 2,239,266

SPECTACLE MOUNTING

Morris Epstein, Brooklyn, N. Y., assignor to Epstein, Wiener & Jacoby, New York, N. Y., a copartnership composed of Morris Epstein, Daniel Wiener, and Isidore Jacoby Application August 28, 1939, Serial No. 292,221

3 Claims. (Cl. 88—47)

This invention relates to spectacle mountings and more particularly to the type employing split lens-rims.

An object of this invention is to provide a novel and improved spectacle mounting, the assembly of which may be free of screw or rivet joint connections.

Another object is to provide an article of the character mentioned of novel and improved construction, wherein the components are so related that they mutually aid their assembly and facilitate the mounting of the lenses.

A further object is to provide a novel and improved spectacle mounting which is cheap to manufacture, requiring little skill to assemble and mount the lenses therein, and which is efficient for the purposes for which it is designed.

To attain these objects, and others which will become manifest as this disclosure proceeds, this invention teaches the construction of a spectacle mounting wherein the lenses are in effect "lassoed"; the lens-rim of the mounting acting as the loop of a noose.

This invention is capable of numerous forms and various applications without departing from the essential features herein disclosed. It is therefore desired and intended that the patent shall cover whatever teachings of patentable novelty are herein disclosed and that the specific description herein of one way of practicing this invention shall be deemed illustrative and not restrictive; reference being had to the appended claims rather than to the particular description of the embodiment explained herein, to indicate the scope of this invention.

In the accompanying drawing forming part of this application, similar characters of reference indicate corresponding parts in all the views.

Figure 1:
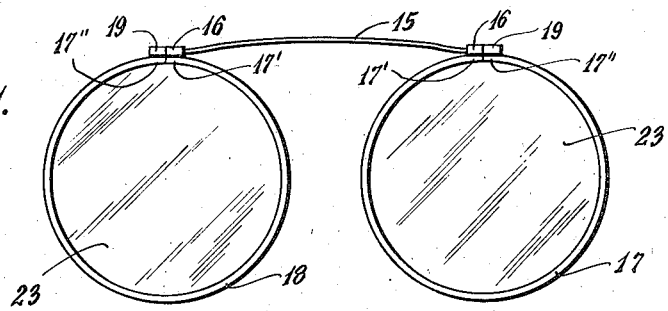
Fig. 1 is a front view of a spectacle mounting constructed in accordance with the teachings of this invention, fully assembled with lenses.
Figure 2:
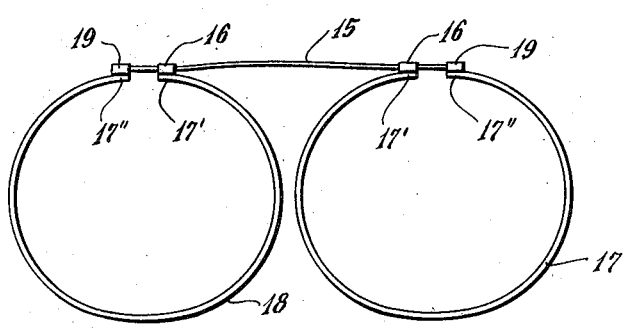
Fig. 2 is a similar view, minus the lenses, showing the lens-rims "enlarged" ready to receive the lenses therein.
Figure 3:
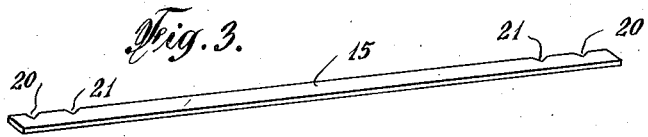
Fig. 3 is an enlarged perspective view showing the nose piece included in the mounting illustrated in Fig. 1.
Figure 4:
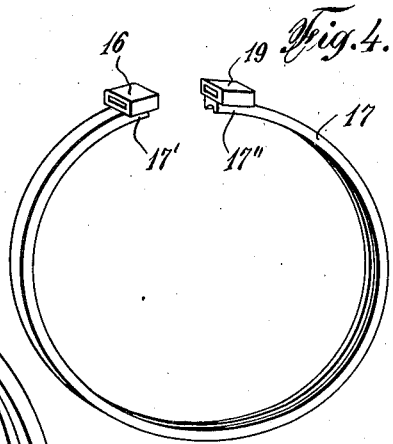
Fig. 4 is an enlarged perspective view showing one of the lens-rims of said mounting.
Figure 5:
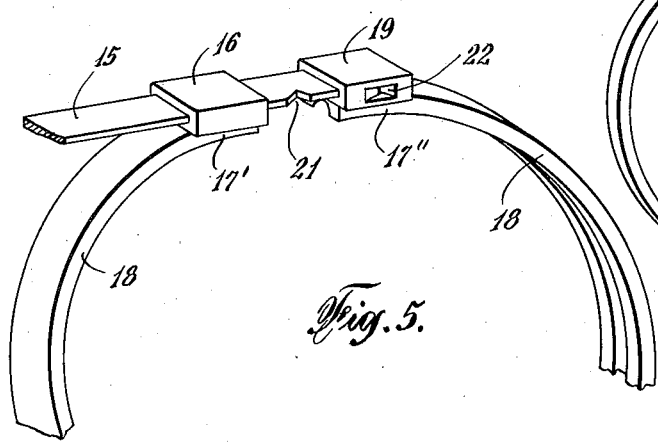
Fig. 5 is an enlarged, fragmentary, rear, perspective view of Fig. 2, showing a joint construction involving nose piece and lens-rim.

In the drawing, the numeral 15 indicates a nose piece which may be of any desired type, even other than the flat blade spring shown, whose ends may receive the sleeve elements 16, which initially are free to slide thereon. Split lens-rims 17 and 18, which may be designed to frame lenses of any desired shape, as circular, oval, polygonal or irregular, are included in the structure. Tubular elements 16 and 19 are secured respectively onto the respective ends 17' and 17'' of the lens-rims. However, to facilitate manufacture, a single tubular member (not shown) may be secured across the ends 17' and 17'', with the rim in closed condition, and then said tubular member is severed to form elements 16 and 19. The nose piece 15, is preferably, though not necessarily provided with notches 20 and 21 at each end thereof.

To continue with the assembly, an end of the nose piece 15, is slid through both tubular elements 16 and 19, and in the embodiment shown, in that order, but not out of 19, which latter element is now dented at 22 into notch 20. In like manner, the second lens-rim is also mounted on the other end of said nose piece, whereby the spectacle mounting is complete, and upon shifting ends 17' of the rims towards the centre-line of the nose piece 15, the lenses 23 may be inserted in the rims 17 and 18. Said rims are now closed by shifting related elements 16 and 19 into abutment, whereupon the elements 16 are dented in the respective notches 21. Of course, without altering the relationships of the components, they may be mounted and secured by any other suitable means or methods.

Having set forth and fully explained an embodiment of my present invention, I claim:

1. In a spectacle mounting, a nose piece provided with a notch near one end, a sleeve element positioned loose about and slidable along the nose piece and a split lens-rim; one end of the rim being secured to the nose piece and the other end of the rim being secured to the sleeve element; the wall of the sleeve element being adapted to be bent to lie within said notch, whereby the rim is maintained closed.

2. In a spectacle mounting, a nose piece provided with a notch near one end, a sleeve element positioned loose about and slidable along the nose piece and a split lens-rim; one end of the rim being secured to an end of the nose piece and the other end of the rim being secured to the sleeve element; the wall of the sleeve element being adapted to be bent to lie within said notch, whereby the rim is maintained closed.

3. In a spectacle mounting, a nose piece provided with a pair of notches near an end, a pair of sleeve elements positioned loose about and slidable along the nose piece, and a split lens-rim; each end of the rim being secured to a sleeve element; the walls of said sleeve elements being adapted to be bent to lie one in each of said notches, whereby the rim is mounted onto the nose piece and maintained in closed condition.

MORRIS EPSTEIN.